US009464225B2

(12) United States Patent
Collins et al.

(10) Patent No.: US 9,464,225 B2
(45) Date of Patent: Oct. 11, 2016

(54) LUMINESCENT PARTICLES, METHODS OF IDENTIFYING SAME AND LIGHT EMITTING DEVICES INCLUDING THE SAME

(75) Inventors: Brian Thomas Collins, Holly Springs, NC (US); Ronan P. Le Toquin, Ventura, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 12/619,838

(22) Filed: Nov. 17, 2009

(65) Prior Publication Data

US 2010/0127613 A1    May 27, 2010

Related U.S. Application Data

(63) Continuation-in-part of application No. 12/271,945, filed on Nov. 17, 2008, and a continuation-in-part of application No. 12/466,782, filed on May 15, 2009.

(51) Int. Cl.
*C09K 11/77* (2006.01)
*C09K 11/08* (2006.01)

(52) U.S. Cl.
CPC ........ *C09K 11/0883* (2013.01); *C09K 11/7734* (2013.01)

(58) Field of Classification Search
CPC ................ C09K 11/7734; C09K 11/0883
USPC .............. 252/586, 301.4 R, 301.4 F, 301.6 F, 252/301.6 R; 313/503, 486; 356/311; 362/231, 260, 293, 800
See application file for complete search history.

(56) References Cited

U.S. PATENT DOCUMENTS

| | | |
|---|---|---|
| 5,268,614 A | 12/1993 | Labib et al. |
| 6,501,100 B1 | 12/2002 | Srivastava et al. |
| 7,713,442 B2 | 5/2010 | Tian et al. |
| 8,125,139 B2 | 2/2012 | Emoto et al. |
| 2003/0020101 A1* | 1/2003 | Bogner et al. ............... 257/233 |
| 2004/0124758 A1* | 7/2004 | Danielson et al. ........... 313/486 |
| 2005/0189863 A1* | 9/2005 | Nagatomi et al. ........... 313/486 |
| 2005/0231953 A1 | 10/2005 | Reeh et al. |

(Continued)

FOREIGN PATENT DOCUMENTS

| | | |
|---|---|---|
| DE | 3933679 | 5/1991 |
| DE | 10 2007 053770 | 5/2009 |

(Continued)

OTHER PUBLICATIONS

Notification of Transmittal of the International Search Report and the Written Opinion of the International Searching Authority, or the Declaration; International Search Report; Written Opinion of the International Searching Authority—Corresponding to International application No. PCT/US10/55901; Date of mailing: Jan. 12, 2011; 11 pages.

(Continued)

*Primary Examiner* — Ling Choi
*Assistant Examiner* — David L Miller
(74) *Attorney, Agent, or Firm* — Brinks Gilson & Lione

(57) ABSTRACT

A luminescent particle includes a luminescent compound that is configured to perform a photon down conversion on a portion of received light and a reflectance reducing outer surface of the luminescent particle that is operable to increase the portion of received light that is absorbed in the luminescent particle.

10 Claims, 9 Drawing Sheets

(56) References Cited

U.S. PATENT DOCUMENTS

| | | |
|---|---|---|
| 2006/0001352 A1 | 1/2006 | Maruta et al. |
| 2006/0208260 A1 | 9/2006 | Sakuma et al. |
| 2006/0263627 A1 | 11/2006 | Grampeix et al. |
| 2007/0007494 A1 | 1/2007 | Hirosaki et al. |
| 2007/0114548 A1 | 5/2007 | Setlur et al. |
| 2007/0278935 A1* | 12/2007 | Harada .......................... 313/503 |
| 2009/0046453 A1 | 2/2009 | Kramer |
| 2009/0050846 A1 | 2/2009 | Becker et al. |
| 2009/0072708 A1* | 3/2009 | Tamaki et al. ................ 313/503 |
| 2009/0309112 A1* | 12/2009 | Yoshimatsu .................... 257/98 |
| 2010/0283076 A1 | 11/2010 | Winkler et al. |

FOREIGN PATENT DOCUMENTS

| | | | |
|---|---|---|---|
| JP | 2006-265506 | 10/2006 | |
| JP | 2006-348244 A | 12/2006 | |
| JP | 2007-324475 | 12/2007 | ............. H01L 33/00 |
| JP | 2008-150518 | 7/2008 | ............. C09K 11/08 |
| KR | 10-0681498 | 2/2007 | |
| WO | WO 2005/116163 | 12/2005 | |
| WO | WO 2005-116163 | 12/2005 | |
| WO | WO2007/052200 A1 | 5/2007 | |
| WO | WO 2007072899 A1 * | 6/2007 | |

OTHER PUBLICATIONS

Notification of Transmittal of the International Preliminary Report on Patentability Corresponding to International Application No. PCT/US2010/034835; Date of Mailing: Jul. 28, 2011; 18 pages.

Thomas et al., "Photoluminescence Enhancement in Eu Doped GaN Powder by Oxidative Passivation of the Surface," Mater. Res. Symp. Proc. vol. 111, Dec. 2008.

Chinese Office Action, Issued Jul. 24, 2014, for Chinese Patent Application No. 201080032353.X, pp. 1-4.

International Preliminary Report On Patentability Corresponding To International Application No. PCT/US2010/055901; Date of Mailing: May 31, 2012; 9 Pages.

European Search Report for European Patent Application No. 10832001.1, dated Nov. 5, 2014 (8 pages).

Notification of Reasons for Rejection issued by Japanese Patent Office in Japanese Patent Application No. 2012-520843 on May 1, 2013.

* cited by examiner

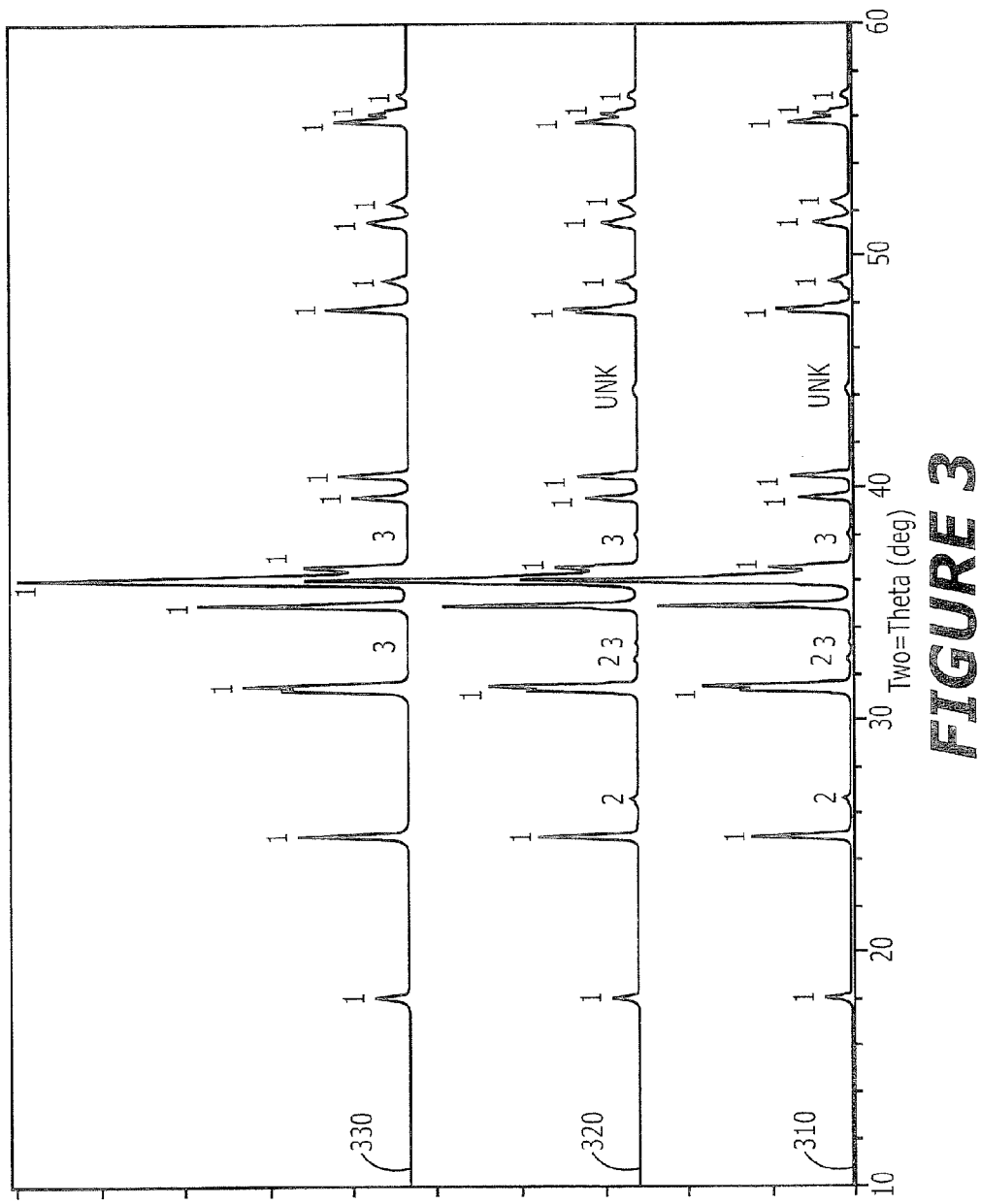

LUMINESCENT PARTICLES, METHODS OF IDENTIFYING SAME AND LIGHT EMITTING DEVICES INCLUDING THE SAME

RELATED APPLICATIONS

The present application is a continuation-in-part of U.S. patent application Ser. No. 12/271,945, filed on Nov. 17, 2008 and U.S. patent application Ser. No. 12/466,782, filed on May 15, 2009, the disclosures of which are hereby incorporated by reference as if set forth fully herein.

BACKGROUND

The present invention relates to luminescent particles and light emitting devices including the same. More particularly, the present invention relates to luminescent particles that may be useful in light emitting devices.

Light emitting diodes and laser diodes are well known solid state lighting elements capable of generating light upon application of a sufficient voltage. Light emitting diodes and laser diodes may be generally referred to as light emitting diodes ("LEDs"). LEDs generally include a p-n junction formed in an epitaxial layer grown on a substrate such as sapphire, silicon, silicon carbide, gallium arsenide and the like. The wavelength distribution of the light generated by the LED generally depends on the material from which the p-n junction is fabricated and the structure of the thin epitaxial layers that make up the active region of the device.

LEDs may be used in devices to provide, for example, display backlighting. LEDs may also be used in lighting/illumination applications, for example, as a replacement for conventional incandescent and/or fluorescent lighting. In some lighting applications, it may be desirable to provide a lighting source that generates light having specific properties. For example, it may be desirable to provide a lighting source that generates white light having a relatively high color rendering index (CRI) so that objects illuminated by the lighting may appear more natural. The color rendering index of a light source is an objective measure of the ability of the light generated by the source to accurately illuminate a broad range of colors. The color rendering index ranges from essentially zero for monochromatic sources to nearly 100 for incandescent sources.

In addition, the chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the color or hue of the white light source. White light typically has a CCT of between about 4000 and 8000K. White light with a CCT of 4000 has a yellowish color. White light with a CCT of 8000K is more bluish in color, and may be referred to as "cool white". "Warm white" may be used to describe white light with a CCT of between about 2500K and 3500K, which is more reddish in color.

In order to produce white light, multiple LEDs emitting light of different colors of light may be used. The light emitted by the LEDs may be combined to produce a desired intensity and/or color of white light. For example, when red-, green- and blue-emitting LEDs are energized simultaneously, the resulting combined light may appear white, or nearly white, depending on the relative intensities of the component red, green and blue sources. However, in LED lamps including red, green, and blue LEDs, the spectral power distributions of the component LEDs may be relatively narrow (e.g., about 10-30 nm full width at half maximum (FWHM)). While it may be possible to achieve fairly high luminous efficacy and/or color rendering with such lamps, wavelength ranges may exist in which it may be difficult to obtain high efficiency (e.g., approximately 550 nm).

In addition, the light from a single-color LED may be converted to white light by surrounding the LED with a wavelength conversion material, such as a luminescent material. Some examples of luminescent materials may include, for example, materials described as phosphors and may include phosphor particles. A phosphor particle may refer to any material that absorbs light at one wavelength and re-emits light at a different wavelength, regardless of the delay between absorption and re-emission and regardless of the wavelengths involved. Accordingly, the term "phosphor" may be used herein to refer to materials that are sometimes called fluorescent and/or phosphorescent. In general, phosphors may absorb light having first wavelengths and re-emit light having second wavelengths that are different from the first wavelengths. For example, down conversion phosphors may absorb light having shorter wavelengths and re-emit light having longer wavelengths. As such, some or all of the light emitted by the LED at a first wavelength may be absorbed by the phosphor particles, which may responsively emit light at a second wavelength.

In some environments, luminescent particles may be susceptible to degradation resulting from a reaction in that environment. Such degradation may result in performance changes including, for example, a change in the emitted color over time.

SUMMARY

Some embodiments of the present invention include a luminescent particle that includes a luminescent compound that is configured to perform a photon down conversion on a portion of received light. The particle may include a reflectance reducing outer surface of the luminescent particle that is operable to increase the portion of received light that is absorbed in the luminescent particle. Some embodiments include multiple first luminescent particles including the luminescent particle that may include a first size range and a first diffuse reflectance at a dominant wavelength of light and multiple second luminescent particles not including the luminescent particle that may include a second size range and a second diffuse reflectance at the dominant wavelength of light.

Some embodiments provide that the dominant wavelength of light is about 450 nm, that the first size range and the second size range are substantially similar, and that the first diffuse reflectance is substantially less than the second diffuse reflectance. In some embodiments, the first diffuse reflectance includes about ninety-five percent of the second diffuse reflectance. Some embodiments provide that the first diffuse reflectance includes about ninety-two percent of the second diffuse reflectance. In some embodiments, the first diffuse reflectance includes about ninety percent of the second diffuse reflectance.

Some embodiments provide that the dominant wavelength of light is about 450 nm, that the first size range includes particles that are smaller than particles in the second size range, and that the first diffuse reflectance is substantially similar to the second diffuse reflectance. In some embodiments, a difference between the first diffuse reflectance and the second diffuse reflectance is less than about five percent.

Some embodiments provide that the dominant wavelength of light corresponds to substantially blue light in the visible spectrum, that a first weight percent of the first particles is mixed with an encapsulant to yield an emission color that is a combination of the dominant wavelength and light emitted from the first particles via a photon down converting characteristic thereof. A second weight percent of the second particles is mixed with the encapsulant to yield the emission color that is a combination of the dominant wavelength and light emitted from the second particles via a photon down converting characteristic thereof. Some embodiments provide that the first weight percent is less than the second weight percent. In some embodiments, the first weight percent is about ninety percent of the second weight percent. Some embodiments provide that the first weight percent is about seventy-five percent of the second weight percent. In some embodiments, the first weight percent is about sixty-seven percent of the second weight percent.

Some embodiments provide that the dominant wavelength of light corresponds to substantially blue light in the visible spectrum and that a first ratio of multiple yellow emitting light conversion particles to the first particles are arranged in an emission path of the dominant wavelength of light to yield a warm white emission color that is a combination of the dominant wavelength and light emitted from the first particles via a photon down converting characteristic thereof and the yellow emitting light conversion particles. In some embodiments, a second ratio of the yellow emitting light conversion particles to the second particles are arranged in an emission path of the dominant wavelength of light to yield the warm white emission color that is a combination of the dominant wavelength and light emitted from the second particles via a photon down converting characteristic thereof and the yellow emitting light conversion particles. Some embodiments provide that the first ratio is substantially greater than the second ratio. In some embodiments, the first ratio includes a first percent weight ratio and the second ratio includes a second percent weight ratio. Some embodiments provide that the second ratio includes about eighty-percent of the first ratio. In some embodiments, the second ratio includes about sixty-five percent of the first ratio. Some embodiments provide that the second ratio includes about fifty percent of the first ratio.

Some embodiments of the present invention include methods of identifying a potency to excitation characteristic in a luminescent particle. Such methods may include comparing a photon down converting performance of a first group of luminescent particles that includes the luminescent particle according to luminescent particles described herein with a second group of luminescent particles that does not include luminescent particles described herein. Some embodiments provide that comparing the photon down converting performance includes estimating respective reflectance signatures corresponding to each of the first and second groups of luminescent particles.

In some embodiments, comparing the photon down converting performance further includes comparing estimated reflectance signatures corresponding to each of the first and second groups of luminescent particles to determine which of the first and second groups includes a higher absorption rate. Some embodiments provide that the absorption rate is substantially inversely related to the reflectance.

In some embodiments, comparing the estimated reflectance signatures includes estimating a first diffuse reflectance of the first group of luminescent particles, estimating a second diffuse reflectance of the second group of luminescent particles, and identifying that the first diffuse reflectance is less than the second diffuse reflectance as indication that the first group of luminescent particles include a greater potency to excitation characteristic than the second group of luminescent particles.

Some embodiments provide that estimating the first diffuse reflectance includes directing light including a dominant wavelength of light at the first group of luminescent particles, receiving reflected light including the dominant wavelength of light from the first group of luminescent particles and estimating the diffuse reflectance as a function of the received reflected light from the first group of luminescent particles. Estimating the second diffuse reflectance may include directing light including the dominant wavelength of light at the second group of luminescent particles, receiving reflected light including the dominant wavelength of light from the second group of luminescent particles and estimating the diffuse reflectance as a function of the received reflected light from the second group of luminescent particles.

Some embodiments provide that the dominant wavelength of light corresponds to a substantially blue light in the visible spectrum. In some embodiments, the dominant wavelength of light is in a range of about 380 to about 470 nm and the luminescent particle absorbs at least some of the light emitted from the light emitting source and emits light having a maximum emission at a wavelength in a range of about 500 to about 700 nm. Some embodiments provide that the dominant wavelength of light is about 450 nm.

In some embodiments, the first group of luminescent particles correspond to a first particle size range and the second group of luminescent particles correspond to a second particle size range, and the first particle size range is substantially similar to the second particle size range. Some embodiments provide that the first particle size range provides that about fifty percent of the first group of particles are less than a first size. The second particle size range may provide that about fifty percent of the second group of particles are less than a second size that is less than about 1.0 micrometer different from the first size. Some embodiments provide that the dominant wavelength of light is about 450 nm, that the photon down converting performance of the first group of luminescent particles corresponds to a first diffuse reflectance, and that the photon down converting performance of the second group corresponds to a second diffuse reflectance. In such embodiments, the first diffuse reflectance may include about ninety-five percent of the second diffuse reflectance.

Some embodiments provide that the dominant wavelength of light is about 450 nm, that the photon down converting performance of the first group of luminescent particles corresponds to a first diffuse reflectance, and that the photon down converting performance of the second group corresponds to a second diffuse reflectance. In such embodiments, the first diffuse reflectance may include about ninety-two percent of the second diffuse reflectance.

In some embodiments, the dominant wavelength of light is about 450 nm, the photon down converting performance of the first group of luminescent particles corresponds to a first diffuse reflectance, and the photon down converting performance of the second group corresponds to a second diffuse reflectance. In such embodiments, the first diffuse reflectance may include about ninety percent of the second diffuse reflectance.

Some embodiments provide that the first group of luminescent particles corresponds to a first particle size range and the second group of luminescent particles corresponds to a second particle size range and that the first particle size range includes particles that are substantially smaller than the particles in the second particle size range. In some embodiments, the first particle size range provides that about fifty percent of the first group of particles are less than a first size and the second particle size range provides that about fifty percent of the second group of particles are less than a second size. In some embodiments, the first size is about seventy-five percent the value of the second size. Some embodiments provide that the first size is about 6.4 micrometers and the second size is about 8.6 micrometers.

In some embodiments, the dominant wavelength of light is about 450 nm, the photon down converting performance of the first group of luminescent particles corresponds to a first diffuse reflectance, and the photon down converting performance of the second group corresponds to a second diffuse reflectance. Some embodiments provide that a difference between the first diffuse reflectance and the second diffuse reflectance is about five percent of the second diffuse reflectance.

Some embodiments provide that the first group of luminescent particles corresponds to a first particle size range and the second group of luminescent particles corresponds to a second particle size range. The first particle size range may include substantially larger particles than particles in the second particle size range. In some embodiments, the first particle size range provides that about fifty percent of the first group of particles are less than a first size and the second particle size range provides that about fifty percent of the second group of particles are less than a second size. Some embodiments provide that a value of the second size is about fifty percent that of a value of the first size. In some embodiments, the first size is about 12.8 micrometers and the second size is about 6.4 micrometers.

Some embodiments provide that the dominant wavelength of light is about 450 nm, the photon down converting performance of the first group of luminescent particles corresponds to a first diffuse reflectance and the photon down converting performance of the second group corresponds to a second diffuse reflectance. In some embodiments, a difference between the first diffuse reflectance is about ninety percent of the second diffuse reflectance.

Some embodiments provide that the dominant wavelength of light is about 450 nm, the photon down converting performance of the first group of luminescent particles corresponds to a first diffuse reflectance, and the photon down converting performance of the second group corresponds to a second diffuse reflectance. In some embodiments, a difference between the first diffuse reflectance is about eighty percent of the second diffuse reflectance.

In some embodiments, the luminescent particle includes a phosphor composition that absorbs in the blue portion of the visible spectrum and emits in the red portion of the visible spectrum. Some embodiments provide that the luminescent particle is configured to be in a light path of a light emitting source and to perform a photon down conversion on a portion of the light received therefrom.

Some embodiments of the present invention include a light emitting device that includes a luminescent particle as described herein and a light emitting source. Some embodiments provide that the luminescent particle is dispersed within a silicone encapsulant. In some embodiments, the light emitting source emits radiation with a maximum emission at a wavelength in a range of about 380 to about 470 nm. The luminescent particle may absorb at least some of the light emitted from the light emitting source and emit light having a maximum emission at a wavelength in a range of about 500 to about 700 nm.

In some embodiments, multiple first luminescent particles including the luminescent particle described herein may include a first size range and a first diffuse reflectance at a dominant wavelength of light and multiple second luminescent particles not including the luminescent particle described herein may include a second size range that is substantially similar to the first size range and a second diffuse reflectance at the dominant wavelength of light.

BRIEF DESCRIPTION OF THE DRAWINGS

FIG. 3 is a graph comparing x-ray powder diffraction data of a luminescent particle, a luminescent particle stabilized using $H_2O$ and a luminescent particle stabilized using an acid solution according to some embodiments of the present invention.

DETAILED DESCRIPTION

Figure 1:
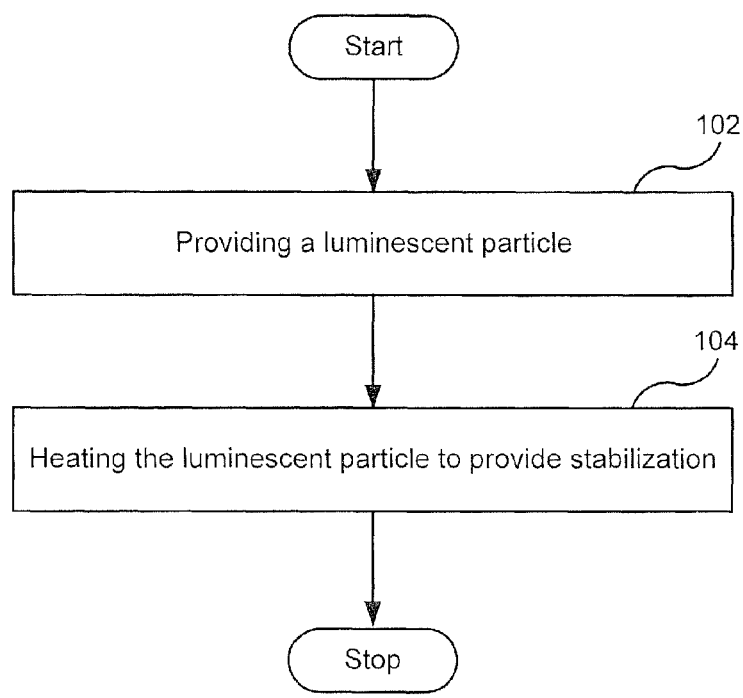
FIG. 1 is a flow diagram illustrating methods of providing a luminescent particle according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers refer to like elements throughout the specification.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. Accordingly, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

According to some embodiments of the present invention, luminescent particles provided may include luminescent nitride particles and may be useful as phosphors. The term "luminescent particle" is used herein to describe phosphor particles made from host materials including nitrides, oxynitrides, sulfides, selenides, halides and/or silicates of zinc, cadmium, manganese, aluminum, silicon, and/or various rare earth metals. For example, phosphors may include Ce-doped YAG (YAG:$Ce^{3+}$, or $Y_3Al_5O_{12}$:$Ce^{3+}$), Ba, Ca, Sr orthosilicate, and/or TAG:Ce among others. The term "luminescent nitride particle" is used herein to describe particles including phosphors for which the anion is predominantly nitride and in which the amount of oxygen present in the crystal structure is so minimal as to avoid changing the crystal structure from that fundamentally formed by the nitride.

Although it is recognized that there is no bright line or exact boundary that defines the amount of oxygen present that causes the composition to be categorized as a nitride, generally speaking only small amounts of oxygen may be present. Specifically, some embodiments of the present invention provide stabilized phosphor materials that may be useful in warm white solid state light emitting devices.

For example, it is known that a single blue emitting LED may be used in combination with a yellow phosphor, and that the combination of blue light and yellow light may appear white to an observer. Red-emitting phosphor particles may also be added to improve the color rendering properties of the light, i.e., to make the light appear more "warm". As described in pending U.S. patent application Ser. No. 12/271,945, which is incorporated by reference in its entirety, some compounds may be useful as phosphors that may produce warm white light when used in an LED that includes a blue emitting solid state die.

Luminescent particles may be subject to physical changes and/or reactions resulting from environmental conditions, including, for example, high heat and/or high humidity. Such reactions may result in a shift in the dominant wavelength of light output and/or the brightness of the light output. In some embodiments described herein, such luminescent particles may be stabilized such that variations in the wavelength and/or brightness due to environmental changes and/or reaction effects may be reduced. As described herein, some embodiments of a luminescent particle may be described as reacted and/or stabilized to indicate that one or more operations described herein have been performed thereon. Similarly, some embodiments of a luminescent particle may be described as unreacted and/or unstabilized to describe a particle upon which some operations described herein may not have been performed.

Techniques described herein with respect to the characterization of properties (e.g., x-ray powder diffraction) of a luminescent particle are generally well understood and can be conducted by persons of ordinary skill in this art without undue experimentation. Accordingly, such well-understood techniques of characterization have not been described in detail.

For example, reference is now made to FIG. 1, which is a flow diagram illustrating methods of providing a luminescent particle according to some embodiments of the present invention. Methods include providing a luminescent particle (block 102). Some embodiments provide that providing the luminescent particle may include forming the luminescent particle and/or acquiring the luminescent particle. In some embodiments, forming the luminescent particle may be performed at temperatures in a range between 1500 and 1850 degrees Centigrade. Some embodiments provide that forming the luminescent particle may be performed at temperatures in a range between about 1650 degrees Centigrade and about 1750 degrees Centigrade.

In some embodiments, the luminescent particle includes a phosphor formed from a host compound and at least one activator. Some embodiments provide that the host compound may be selected from a group including $Ca_2Si_5N_8$, $Sr_2Si_5N_8$, $Ba_2Si_5N_8$, $BaSi_7N_{10}$, $BaYSi_4N_7$, $Y_5(SiO_4)_3N$, $Y_4Si_2O_7N_2$, $YSiO_2N$, $CaSi_2O_2N_2$, $SrSi_2O_2N_2$, $BaSi_2O_2N_2$, $Y_2Si_3O_3N_4$, $Y_2Si_3-xAl_xO_3+xN_4-x$, $Ca_{1.5}Si_9Al_3N_{16}$, $Y_{0.5}Si_9Al_3O_{1.5}N_{14.5}$, $CaSiN_2$, $Y_2Si_4N_6C$, and/or $Y_6Si_{11}N_{20}O$, among others. In some embodiments, an activator may be selected from a group including Ce, Eu, Sm, Yb, Gd and/or Tb, among others. Some embodiments provide that the host compound is $Ca_{1-x}Sr_xAlSiN_3$.

Methods according to some embodiments may include heating the luminescent particle for stabilization (block 104). Some embodiments provide that heating the luminescent particle includes reacting the luminescent particle in a heated liquid medium. As described herein, reacting may include chemical, physical, structural and/or surface reactions. Some embodiments provide that reacting the luminescent particle may alter and/or reduce a reactive characteristic of the outer surface of the luminescent particle. For example, in some embodiments, reducing the reactive characteristic may include forming a passivating layer on the outer surface of the luminescent particle.

In some embodiments, the passivating layer includes a greater oxygen content relative to an interior portion of the luminescent particle. For example, the reacting process may provide a protective oxide layer over the outer surface of the luminescent particle that limits and/or reduces subsequent reaction due to environmental conditions such as high temperature and/or high humidity. Some embodiments provide that reacting the luminescent particle includes removing at least one material from the outer surface of the luminescent particle. For example, in some embodiments, the passivating layer includes a decreased percent nitrogen relative to interior portions of a luminescent particle.

In some embodiments, reacting the luminescent particle in a heated liquid medium includes boiling the luminescent particle in an aqueous solution. In some embodiments, the aqueous solution may be water that is substantially absent other constituent components. For example, some embodiments provide that the luminescent particle may be boiled in de-ionized water. In this regard, a temperature of the aqueous solution may be maintained at the boiling point thereof for a specified duration. In some embodiments, the duration of the boiling operation may be about an hour. However, embodiments herein are not so limited. For example, the duration may be less than or more than an hour. In some embodiments, the duration may be in a range of about 1 minute to about 60 minutes, about 10 minutes to about 50 minutes, about 20 minutes to about 40 minutes, about 50 minutes to about 70 minutes, and/or about 40 minutes to about 80 minutes, among others.

In some embodiments, reacting the luminescent particle may include boiling the luminescent particle in an acid solution, including for, example, a nitric acid solution. Some embodiments provide that the acid solution may be limited in concentration to reduce a chemical attack on the luminescent particle. For example, some embodiments provide that the luminescent particle may be reacted by boiling in a nitric acid solution having a concentration of less than about 0.1 moles/liter.

As discussed above, some embodiments of the luminescent particle include a phosphor that may be configured to down-convert received photons in the blue and/or ultraviolet portions of the visible spectrum into photons in longer wavelength portions of the visible spectrum. For example, a luminescent particle may include a red nitride that is a phosphor composition that absorbs in the blue portion of the visible spectrum and emits in the red portion of the visible spectrum.

Figure 2A:
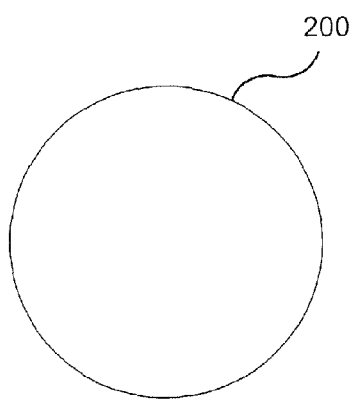
FIGS. 2A and 2B are cross-sectional views of a luminescent particle and a stabilized luminescent particle, respectively, according to some embodiments of the present invention.
Figure 2B:
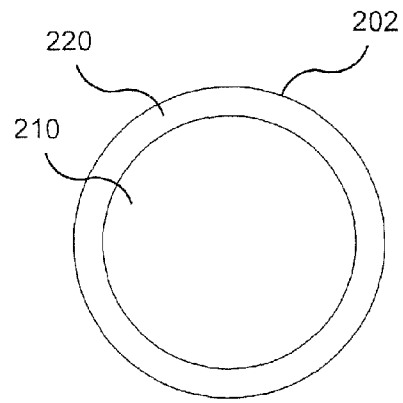

Brief reference is made to FIGS. 2A and 2B, which are cross-sectional views of a luminescent particle and a stabilized luminescent particle, respectively, according to some embodiments of the present invention. Referring to FIG. 2A, the luminescent particle 200 may include a luminescent compound throughout the surface and interior portion of the particle. Referring to FIG. 2B, a stabilized luminescent particle 202 may include an interior portion 210 that includes the luminescent compound that is substantially the same as the luminescent particle 200. In some embodiments, the luminescent compound may react with atmospherically present materials and/or conditions. For example, the luminescent compound may react with atmospherically present water vapor under, for example, high humidity and/or high temperature conditions. Some embodiments provide that the reaction may produce one or more resultant gases. For example, in some embodiments, a resultant gas may include $NH_3$.

Some embodiments provide that the stabilized luminescent particle 202 includes a passivating region 220 on the outer surface of the stabilized luminescent particle 202. In some embodiments, the passivating region 220 may be operable to inhibit a reaction between a luminescent compound and atmospherically present components and/or under high humidity and/or high temperature conditions. Some embodiments provide that the passivating region 220 includes a passivating layer.

In some embodiments, the passivating region 220 includes an oxide that may be formed during the exposure of a luminescent particle to a liquid medium that is heated to a threshold temperature. Some embodiments provide that the passivating region 220 includes a greater percentage of oxygen than the interior portion of the luminescent particle. In some embodiments, the passivating region 220 includes a reduced percentage of nitrogen than the interior portion of a stabilized luminescent particle. In this manner, nitrogen that may otherwise react in, for example, high humidity and/or high temperature environments, may be less available for such reaction.

Some embodiments provide that the heated liquid medium to which the luminescent particle is exposed includes an aqueous solution. In some embodiments, the threshold temperature includes the boiling point of the aqueous solution. Some embodiments provide that the liquid medium is water and the threshold temperature is the boiling point of water. Some non-limiting embodiments provide that the luminescent particle is exposed to the heated liquid medium for about an hour. In some embodiments, the thickness of the passivating region 220 may be regulated by adjusting the duration of the exposure to the heated liquid medium.

Some embodiments provide that the liquid medium includes an acid solution. In some embodiments, the acid solution may include nitric acid. A concentration of acid may include a concentration sufficiently dilute to avoid attacking the luminescent particle. For example, some embodiments may use a nitric acid solution having a concentration of less than about 0.1 moles/liter.

In some embodiments, the passivating region 220 includes a reduced nitrogen layer that is formed during exposure of a luminescent compound particle to the liquid medium that is heated to a threshold temperature. Some embodiments provide that the reduced nitrogen layer results from the transition of a portion of surface material from the luminescent particle via the liquid medium.

Some embodiments provide that the luminescent compound includes a phosphor formed from a host compound and at least one activator. Some embodiments provide that the host compound may be elected from a group including $Ca_2Si_5N_8$, $Sr_2Si_5N_8$, $Ba_2Si_5N_8$, $BaSi_7N_{10}$, $BaYSi_4N_7$, $Y_5(SiO_4)_3N$, $Y_4Si_2O_7N_2$, $YSiO_2N$, $Y_2Si_3O_3N_4$, $Y_2Si_{3-x}Al_xO_3+xN_4-x$, $Ca_{1.5}Si_9Al_3N_{16}$, $Y_{0.5}Si_9Al_3O_{1.5}N_{14.5}$, $CaSiN_2$, $Y_2Si_4N_6C$, and/or $Y_6Si_{11}N_{20}O$, among others. In some embodiments, an activator may be elected from a group including Ce, Eu, Sm, Yb, Gd and/or Tb, among others. Some embodiments provide that the host compound is $Ca_{1-x}Sr_xAlSiN_3$.

According to embodiments described herein, the photon down converting performance of the stabilized luminescent particle may be substantially preserved relative to the luminescent compound. For example, experimental data illustrates that the passivating region 220 only slightly reduced the brightness of the emitted light and resulted in little if any shift on the color of the emitted light. In some embodiments, the luminescent particle may include a partially oxidized surface prior to the reaction. Some embodiments provide that this partial oxidation may be a signature of a preparation method used to form the luminescent particle. For example, in some embodiments, a luminescent particle including $Ca_{1-x-y}Sr_xEu_yAlSiN_3$ may include such a signature.

Some embodiments include a luminescent particle that includes a luminescent compound that reacts with a first component and an outer surface that includes a higher concentration of the first component. In some embodiments, the presence of the higher concentration of the first component in the outer surface may provide a reduced reactive characteristic of the luminescent particle relative to the first component.

Reference is now made to FIG. 3, which is a graph comparing x-ray powder diffraction data of a luminescent particle sample, a luminescent particle sample stabilized using $H_2O$ and a luminescent particle sample stabilized using an acid solution according to some embodiments of the present invention. The powder diffraction was carried out in a conventional manner using a sample of the luminescent compound $Ca_{1-x-y}Sr_xEu_yAlSiN_3$ and the results thereof should be generally well understood by one of ordinary skill in this art.

The numeral 1's are provided to identify the diffraction peaks generated by the luminescent particles (phosphors in this case), the numeral 2's are provided to identify the diffraction peaks corresponding to $Si_2Al_4O_4N_4$, the numeral 3's correspond to AlN peaks, and the UNK peaks identify an unknown (to date) material.

The x-ray diffraction data includes a luminescent particle plot 310, a luminescent particle stabilized by boiling water plot 320, and a luminescent particle stabilized by a boiling nitric acid solution plot 330. The y-axis corresponds to intensity, but does not include values as this graph is merely for comparative purposes among the different particle types. Further, note that the boiling water plot 320 and the luminescent particle plot 310 include substantially the same diffraction pattern. In contrast, the boiling acid plot 330 differs from the luminescent particle plot 310 and the boiling water plot 320 as the peaks corresponding to the unknown material UNK appear to be dissolved away by the boiling acid operation. Accordingly, other than the change regarding the unknown material, the diffraction plots of the un-stabilized and the stabilized particles are substantially the same.

Figure 4:
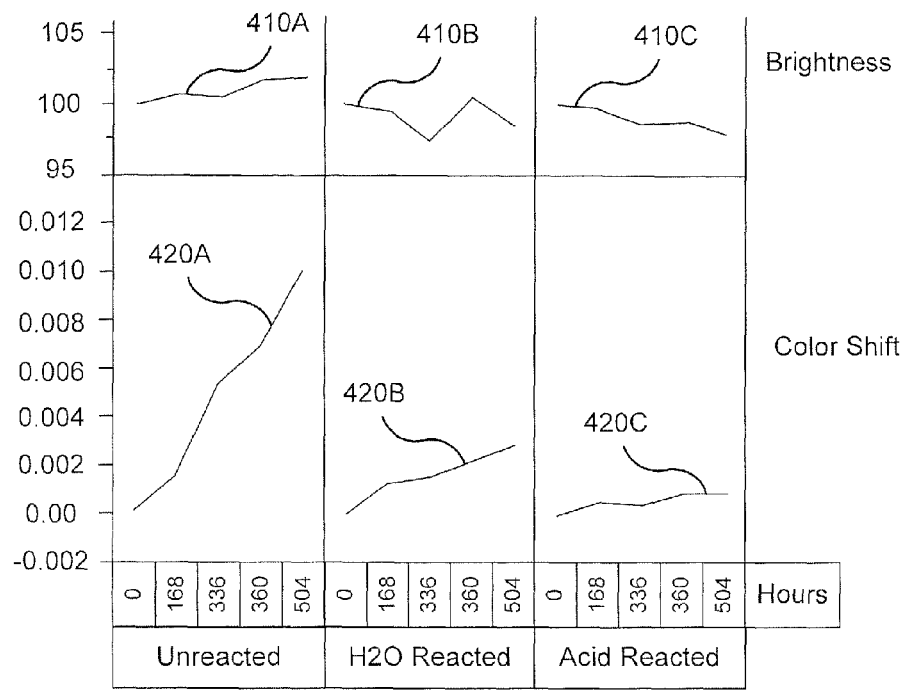
FIG. 4 is a graph comparing color shift and relative brightness reliability of a luminescent particle, a luminescent particle stabilized using $H_2O$ and a luminescent particle stabilized using an acid solution according to some embodiments of the present invention.

Reference is made to FIG. 4, which is a graph comparing relative brightness and color shift reliability of a luminescent particle, a luminescent particle stabilized using $H_2O$ and a luminescent particle stabilized using an acid solution according to some embodiments of the present invention. The top portion of FIG. 4 includes experimental data representing the variability of brightness for each sample compared to an initial value corresponding to time=0 hours for each sample. Specifically, the data corresponds to $Ca_{1-x-y}Sr_xEu_yAlSiN_3$ luminescent particles including an unreacted luminescent particle 410A, a stabilized luminescent particle reacted using boiling water 410B and a stabilized luminescent particle reacted using a 0.1M nitric acid solution 410C. Although described generally in terms of brightness, the measurement may correspond to the luminous flux percent ratio that is measured at specific designated time intervals. For example, luminous flux measurements were taken at 0, 168, 336, 360 and 504 hours for each of the luminescent particle sample types in a high humidity and high temperature environment.

Note that the unreacted luminescent particle plot 410A illustrates that the brightness remained relatively consistent for the duration of the test indicating a slight trend towards improved brightness as a function of time. Both of the stabilized luminescent particle plots 410B, 410C represent a slight decline in brightness as a function of time, but were relatively stable.

The bottom portion of FIG. 4 includes color shift reliability data corresponding to the same sample types and durations as discussed above regarding the brightness data. The color shift data is expressed as a color shift of samples of an unreacted luminescent particle 420A, a stabilized luminescent particle reacted using boiling water 420B and a stabilized luminescent particle reacted using a 0.1M nitric acid solution 420C. Specifically, the color shift is expressed in terms of uv shift, where u and v may represent chrominance components in a YUV color space.

Regarding the relative performance of the samples, note that the unreacted luminescent particle plot 420A demonstrates a significant shift in color over the duration of the test. In contrast, the plot of stabilized luminescent particle reacted using the boiling water 420B illustrates a significantly reduced shift in color relative to the unreacted luminescent particle. Additionally, the plot of stabilized luminescent particle reacted using the acid solution 420C also illustrates a significantly reduced shift in color relative to the unreacted luminescent particle. In this regard, both of the stabilized luminescent particle samples provided significantly better color reliability than the unreacted luminescent particle.

Figure 5:
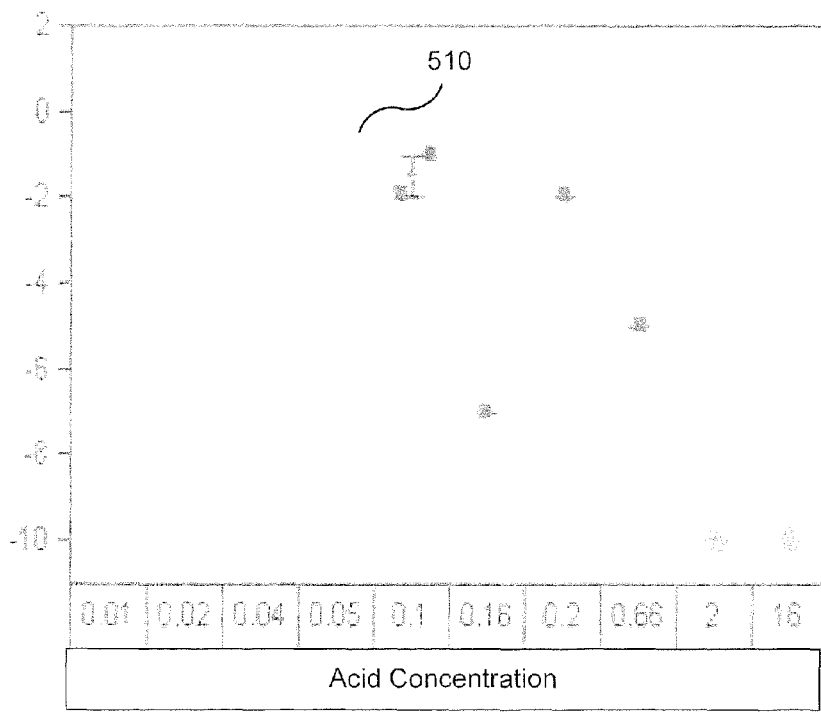
FIG. 5 is a graph illustrating relative brightness as a function of acid concentration in a liquid medium according to some embodiments of the present invention.

Brief reference is now made to FIG. 5, which is a graph illustrating relative brightness as a function of acid concentration in a liquid medium according to some embodiments of the present invention. Various concentrations of acid were analyzed to determine working ranges for using the boiling acid solution to react the luminescent particles. As illustrated, concentrations of nitric acid up to about 0.1 moles/liter did not adversely affect the brightness of the luminescent particles. However, once the concentration exceeded about 0.1 moles/liter, the brightness was reduced, likely as a result of the acid attacking the luminescent particles.

Figure 6:
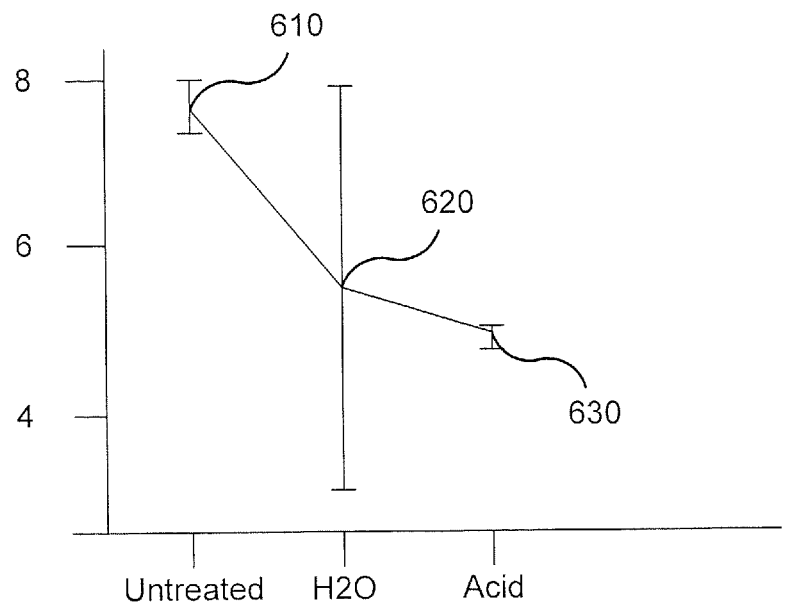
FIG. 6 is a graph comparing brightness variability of a luminescent particle, a luminescent particle stabilized using $H_2O$, and a luminescent particle stabilized using a 0.1M nitric acid solution according to some embodiments of the present invention.

Brief reference is now made to FIG. 6, which is a graph comparing brightness variability of a luminescent particle, a luminescent particle stabilized using $H_2O$, and a luminescent particle stabilized using a 0.1M nitric acid solution according to some embodiments of the present invention. The exemplary brightness variability data as illustrated corresponds to a $Ca_{1-x}Sr_xEu_xAlSiN_3$ compound. Note that the ranges for each un-stabilized, the H2O stabilized and the acid stabilized samples correspond to individual data variability as tested. For comparison purposes, the average brightness values are identified for each of the sample sets. Note that although each of the H2O stabilized 620 and the acid stabilized 630 particle samples do have reduced average brightness values relative to the un-stabilized (untreated) 610 particle samples, the brightness is still within an acceptable range.

Figure 7:
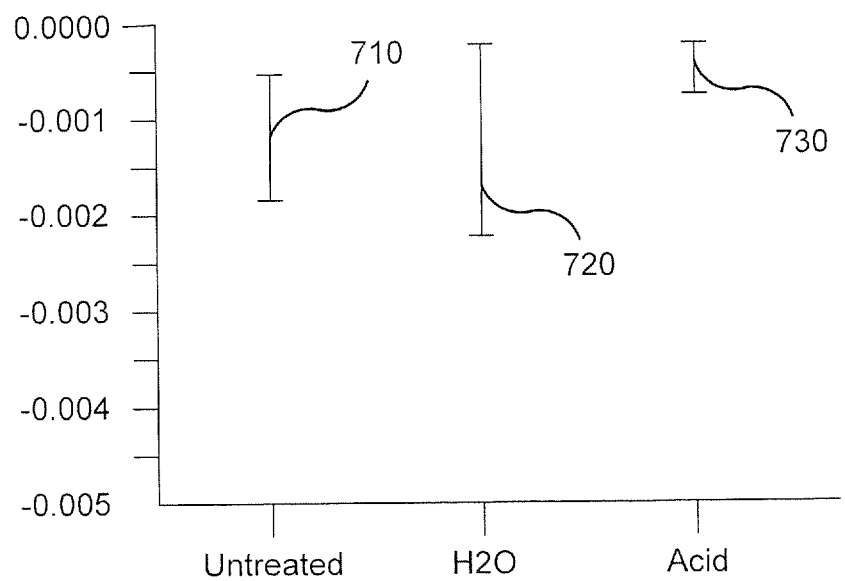
FIG. 7 is a graph comparing color variability of a luminescent particle, a luminescent particle stabilized using $H_2O$, and a luminescent particle stabilized using a 0.1M nitric acid solution according to some embodiments of the present invention.

Brief reference is now made to FIG. 7, which is a graph comparing color variability of a luminescent particle, a luminescent particle stabilized using $H_2O$, and a luminescent particle stabilized using a 0.1M nitric acid solution according to some embodiments of the present invention. The exemplary color variability data as illustrated corresponds to a $Ca_{1-x}Sr_xEu_xAlSiN_3$ compound. The color variability is illustrated as a range of color value shift for the different samples. For example, the ranges of color value variability of the stabilized luminescent particles 720 and 730 illustrate substantially no color change relative to the color value variability range of the unreacted luminescent particle 710. Accordingly, there is almost no change in color as a result of the H2O and acid stabilization.

Figure 8:
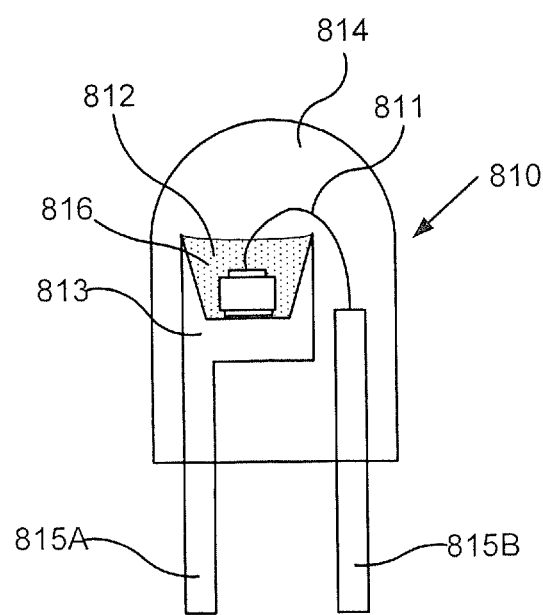
FIG. 8 is a side view of a light emitting device that includes a stabilized luminescent particle according to some embodiments of the present invention.

Reference is now made to FIG. 8, which is a side view of a light emitting device 10 that includes a stabilized luminescent particle according to some embodiments of the present invention. In some embodiments, a light emitting device 810 may include a light emitting source. For example, a light emitting source may include an LED chip 812 that may be mounted on a reflective cup 813 by means of a solder bond or conductive epoxy. One or more wire-bonds 811 may connect the ohmic contacts of the LED chip 812 to leads 815A and/or 815B, which may be attached to and/or integral with the reflective cup 813.

The light emitting device may include a stabilized luminescent particle as described herein. In some embodiments, stabilized luminescent particles may be included in an encapsulant material 816 that may be used to fill the reflective cup 813. For example, in some embodiments the encapsulant material 816 may be a silicone encapsulant. Some embodiments provide that a light emitting device as described herein may include electrical leads, contacts or traces for electrically connecting the device to an external circuit. In some embodiments, the light emitting device may then be encapsulated in a clear protective resin 814. Some embodiments provide that the clear protective resin 814 may be molded in the shape of a lens to collimate the light emitted from the LED chip 812.

In some embodiments, the light emitting source may be a LED chip 812 and the stabilized luminescent particles may be directly coated using any of a variety of phosphor coating techniques. Some embodiments provide that the stabilized luminescent particles may be applied to the LED chip 812 using, for example, electrophoretic deposition, among others.

In some embodiments, the light emitting source emits radiation with a maximum emission at a wavelength in a range of about 380 to about 470 nm and the stabilized luminescent particle absorbs at least some of the light emitted from the light emitting source and emits light having a maximum emission at a wavelength in a range of about 500 to about 700 nm. Such embodiments, however, are merely exemplary and thus light sources operating at different combinations of dominant wavelengths are within the scope disclosed herein.

The light emitting source may include a light emitting diode, a laser diode and/or other semiconductor device that includes one or more semiconductor layers, which may include silicon, silicon carbide, gallium nitride and/or other semiconductor materials, a substrate which may include sapphire, silicon, silicon carbide and/or other microelectronic substrates, and one or more contact layers, which may include metal and/or other conductive layers. The design and fabrication of semiconductor light emitting devices are well known to those having skill in the art and need not be described in detail herein.

For example, light emitting devices according to some embodiments of the present invention may include structures such as the gallium nitride-based LED and/or laser structures fabricated on a silicon carbide substrate, such as those devices manufactured and sold by Cree, Inc. of Durham, N.C. The present invention may be suitable for use with LED and/or laser structures that provide active regions such as described in U.S. Pat. Nos. 6,201,262; 6,187,606; 6,120,600; 5,912,477; 5,739,554; 5,631,190; 5,604,135; 5,523,589; 5,416,342; 5,393,993; 5,338,944; 5,210,051; 5,027,168; 5,027,168; 4,966,862 and/or 4,918,497, the disclosures of which are incorporated herein by reference in their entirety as if set forth fully herein. Other suitable LED and/or laser structures are described in published U.S. Patent Application Publication No. US 2003/0006418 A1 entitled Group III Nitride Based Light Emitting Diode Structures With a Quantum Well and Superlattice, Group III Nitride Based Quantum Well Structures and Group III Nitride Based Superlattice Structures, published Jan. 9, 2003, as well as published U.S. Patent Application Publication No. US 2002/0123164 A1 entitled Light Emitting Diodes Including Modifications for Light Extraction and Manufacturing Methods Therefor, the disclosures of which are hereby incorporated herein by reference in their entirety as if set forth fully herein. Furthermore, phosphor coated LEDs, such as those described in U.S. application Ser. No. 10/659,241, entitled Phosphor-Coated Light Emitting Diodes Including Tapered Sidewalls and Fabrication Methods Therefor, filed Sep. 9, 2003, the disclosure of which is incorporated by reference herein as if set forth fully, may also be suitable for use in some embodiments of the present invention. The LEDs and/or lasers may be configured to operate such that light emission occurs through the substrate. In such embodiments, the substrate may be patterned so as to enhance light output of the devices as is described, for example, in the above-cited U.S. Patent Application Publication No. US 2002/0123164 A1. Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Figure 9:
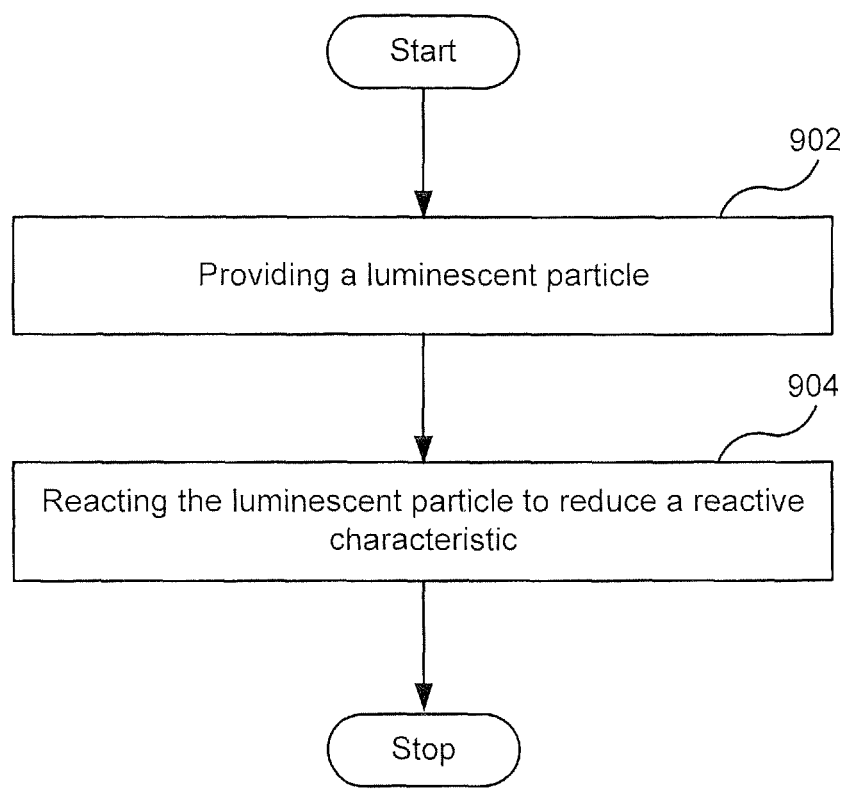
FIG. 9 a flow diagram illustrating methods of providing a luminescent particle according to some embodiments of the present invention.

Brief reference is now made to FIG. 9, which is a flow diagram illustrating methods of providing a luminescent particle according to some embodiments of the present invention. Methods include providing a luminescent particle (block 902). In some embodiments, the luminescent particle may react with a first compound. Some embodiments provide that providing the luminescent particle may include forming the luminescent particle and/or acquiring the luminescent particle. In some embodiments, forming the luminescent particle may be performed at temperatures in a range between 1500 and 1850 degrees Centigrade. Some embodiments provide that forming the luminescent particle may be performed at temperatures in a range between about 1650 degrees Centigrade and about 1750 degrees Centigrade.

Some embodiments provide that the luminescent particle may include a phosphor formed from a host compound and at least one activator. Various embodiments of the host compound and/or activator are discussed above and thus are not described redundantly regarding FIG. 9.

Methods according to some embodiments may include reacting the luminescent particle to reduce a reactive characteristic (block 904). Some embodiments provide that the outer surface includes a passivating region that includes a reduced reactive characteristic relative to an interior portion of the luminescent particle.

In some embodiments, the reactive characteristic may be reduced on an outer surface of the luminescent particle by reacting the luminescent particle in a medium. Some embodiments provide that reacting the luminescent particle in a medium to reduce a reactive characteristic of an outer surface of the luminescent particle forming the passivating region on the outer surface of the luminescent particle. In some embodiments, the passivating region includes a greater percentage of the first component than an interior portion of the luminescent particle.

Some embodiments provide that reacting the luminescent particle in a medium includes reducing a concentration of at least one material from the outer surface of the luminescent particle. In some embodiments, the medium includes an aqueous solution and reacting the luminescent particle includes heating the liquid aqueous solution. Some embodiments provide that the aqueous solution is heated to maintain a temperature substantially at a boiling point of the aqueous solution. For example, some embodiments provide that the luminescent particle may be boiled in de-ionized water. In this regard, a temperature of the aqueous solution may be maintained at the boiling point thereof for a specified duration.

In some embodiments, the passivating region includes a greater oxygen content relative to an interior portion of the luminescent particle. For example, the reacting process may provide a protective oxide layer over the outer surface of the luminescent particle that limits and/or reduces subsequent reaction due to environmental conditions such as high temperature and/or high humidity. Some embodiments provide that reacting the luminescent particle includes removing at least one material from the outer surface of the luminescent particle. For example, in some embodiments, the passivating region includes a decreased percent nitrogen relative to interior portions of a luminescent particle.

Some embodiments provide that a luminescent particle includes a luminescent compound that is configured to perform a photon down conversion on a portion of received light and a reflectance reducing outer surface of the luminescent particle that is operable to increase the portion of received light that is absorbed in the luminescent particle. Some embodiments provide that a group of the luminescent particles may be collectively defined according to a size range. Size ranges may be quantified according to a value that corresponds to a specific percentage of the particles. For example, a value/percent combination may define the size that is larger than the defined percentage of the group of particles. A size range of a group of particles may be defined as having a specific D50 value, which indicates that 50 percent of the particles in that group are smaller than that value. For example, if a group of particles is defined as having a D50 value of 12.5 microns, then 50 percent of the particles in the group are smaller than 12.5 microns.

In some embodiments, the group of particles may exhibit specific reflectance properties. The reflectance may correlate to relative photon down conversion potency. In some embodiments, the reflectance may be estimated and/or measured as diffuse reflectance. Some embodiments provide that the group of luminescent particles may exhibit a specific diffuse reflectance at a particular dominant wavelength. Diffuse reflectance may be determined as a percentage of the light received by a particle or group of particles that is reflected. A lower value of diffuse reflectance may correspond to an increased absorption percentage. In the context of luminescent particles, an increased absorption percentage may correspond to an increased down photon conversion rate. In addition to including different materials that may result in different diffuse reflectance properties, particle size may also affect a diffuse reflectance property. In this manner, different groups of the same material of particles, but having different size ranges, may result in different relative diffuse reflectance properties. For example, as the particle size decreases, the diffuse reflectance for the same material particle may increase. This inverse relationship between the particle size and the diffuse reflectance may be due to the increase in surface area associated with smaller sized particles.

Some embodiments provide that the diffuse reflectance may be determined by directing light at a specific wavelength and/or having a specific dominant wavelength towards a surface of a group of the particles. The measurement may include providing a standard sample holder to reduce variances related to the measurement conditions and/or techniques. The specific wavelength and/or dominant wavelength of light may be directed towards the group of particles in the sample holder at a fixed angle of incidence relative to the surface of the group of particles. A measurement of the percentage of the reflected light at that same wavelength and/or dominant wavelength of light may be performed.

Some embodiments provide that a dominant wavelength may be about 450 nanometers (nm) and may include light that is substantially blue in the visible spectrum. Determining diffuse reflectance among different types of particles may provide an indicator of potency to blue excitation in luminescent particles.

In some embodiments, relevant distinctions between luminescent particles according to embodiments described herein and conventional particles that may be commercially available may be made by determining a size range and/or diffuse reflectance of a first group including particles according to some embodiments described herein and a size range and/or diffuse reflectance of a second group of conventional particles. For example, reference is made to Table 1, which is provided below and includes particle size and diffuse reflectance data corresponding to a conventional luminescent particle and three different luminescent particle sizes according to embodiments herein:

TABLE 1

| Particle | D50 (um) | % Reflectance at 450 nm |
|---|---|---|
| Conventional | 8.6 | 38.0 |
| R1 | 6.4 | 39.8 |
| R2 | 9.4 | 34.2 |
| R3 | 12.8 | 31.1 |

Comparing the conventional luminescent particle and the R2 luminescent particle, the size ranges include substantially similar D50 values, namely 8.6 um and 9.4 um, respectively. In contrast, the diffuse reflectance (% reflectance) of the R2 particle is 34.2%, which is substantially less than the 38% reflectance of the conventional sample. In this regard, the R2 luminescent particle may be determined to have a greater potency to blue excitation than the conventional luminescent particle.

Comparing the conventional luminescent particle and the R1 luminescent particle, the R1 luminescent particle includes a D50 value of 6.4 um, which is smaller than the 8.6 um D50 value of the conventional luminescent particle. The diffuse reflectance of the R1 luminescent particle is 39.8%, which is relatively close to the 38% diffuse reflectance of the conventional luminescent particle. As discussed above, a decrease in particle size corresponds to an increase in diffuse reflectance. For example, the R1 luminescent particle has a smaller size than the R2 luminescent particle and has a correspondingly greater diffuse reflectance. In this manner, luminescent particles having a greater potency to blue excitation may be identified.

Further, the R3 luminescent particles having a D50 value of 12.8, are larger than any of the conventional, R1 or R2 luminescent particles. Accordingly, the diffuse reflectance is 31.1%, which is lower than the conventional, R1, or R2 luminescent particles. In addition to having a reduced diffuse reflectance value as is typical of luminescent particles described herein, the increased size of the R3 luminescent particles also contributes to the reduced diffuse reflectance value.

Figure 10:
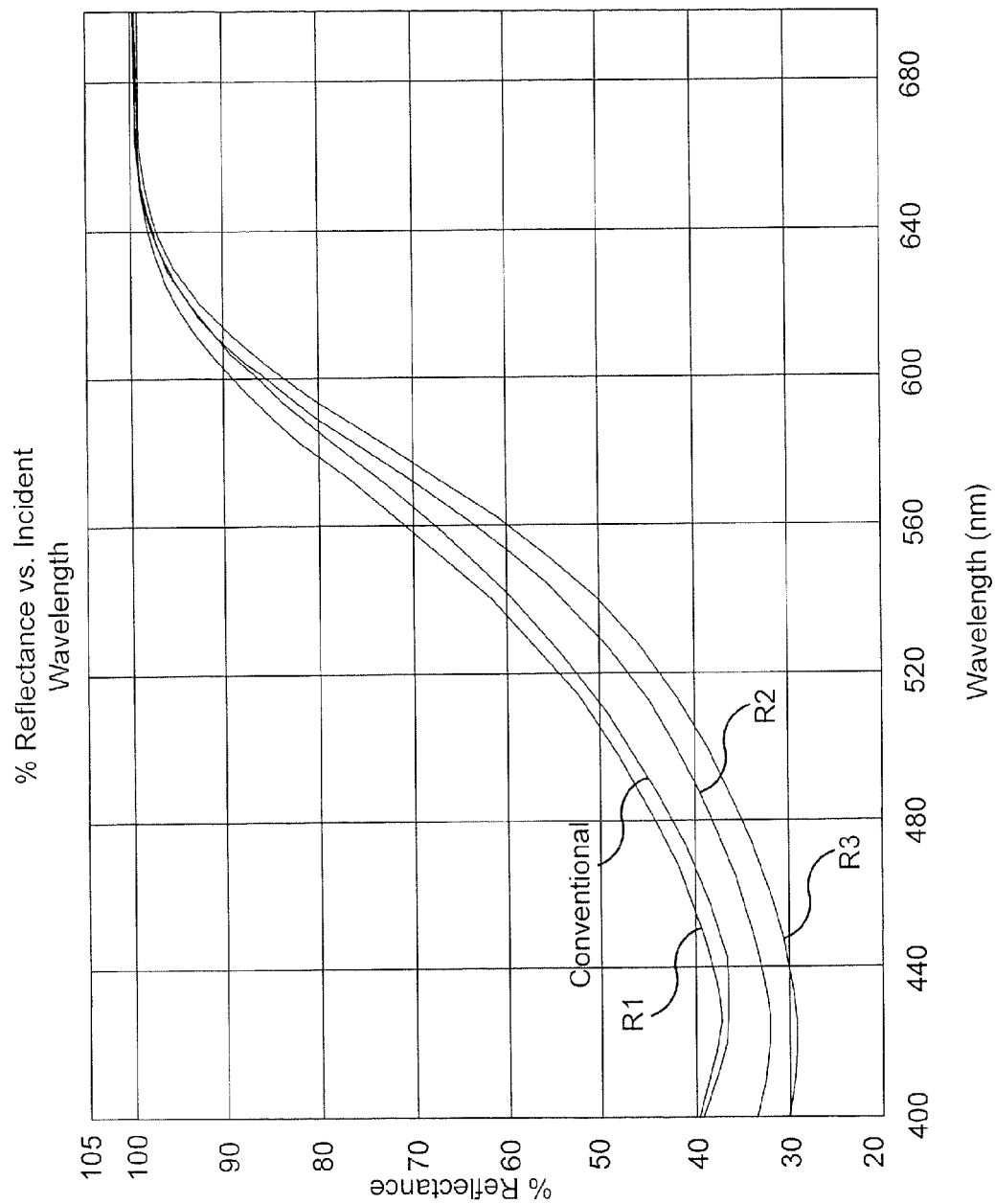
FIG. 10 is a graph comparing percent reflectance of different size particles according to some embodiments of the present invention and a conventionally produced particle.

Reference is now made to FIG. 10, which is a graph comparing percent reflectance of different size particles according to some embodiments of the present invention and a conventionally produced particle. In contrast with Table 1, as discussed above, which lists a single value of diffuse reflectance at a dominant wavelength of about 450 nm, diffuse reflectance of each of the conventional, R1, R2 and R3 luminescent particles at dominant wavelengths from 400 nm to 680 nm is provided in FIG. 10. As discussed above, note that the diffuse reflectance plots of the conventional luminescent particle and the R1 luminescent particle, which is smaller than the conventional particle, are substantially similar even though R1 includes smaller particles. The R2 luminescent particles exhibit a significantly smaller diffuse reflectance relative to the conventional luminescent particles even though the particle sizes are substantially similar. In this regard, the absorption and thus the down photon conversion rate of the R2 luminescent particle is increased relative to the conventional particles having a similar size. Additionally, note that the larger R3 luminescent particles have an even lower diffuse reflectance, due to both the material and particle size difference relative to the conventional, R1 and R2 luminescent particles.

Figure 11A:
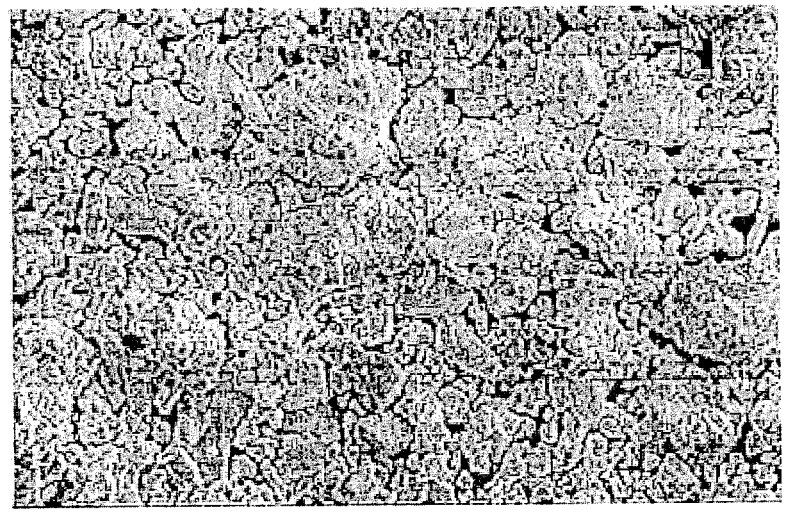
FIGS. 11A-11C are scanning electron microscope (SEM) images of different size particles according to some embodiments of the present invention.
Figure 11B:
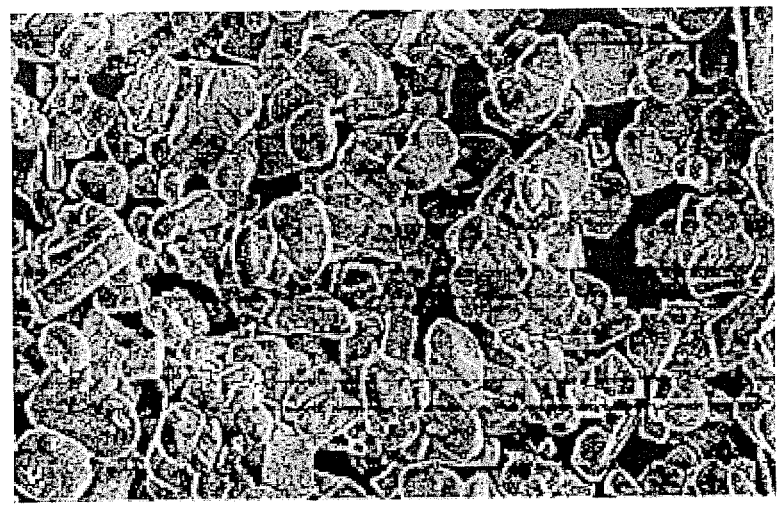
Figure 11C:
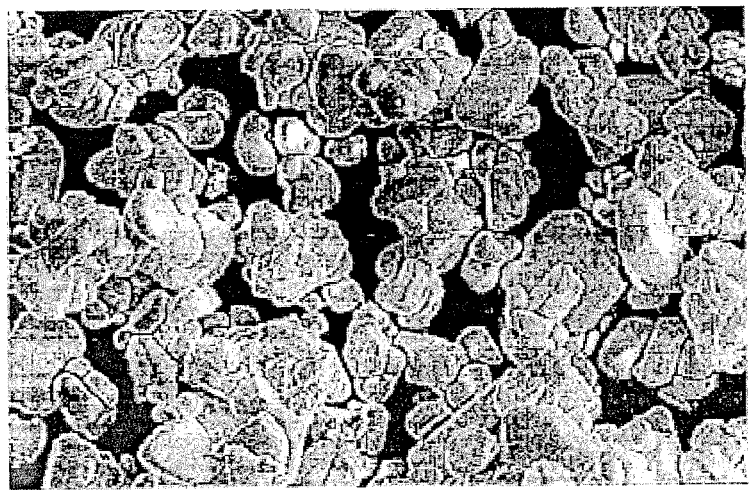

Brief reference is made to FIGS. 11A-11C, which are scanning electron microscope (SEM) images of different size particles according to some embodiments of the present invention. Specifically, each of FIGS. 11A, B and C are SEM images taken at the same magnification level of luminescent particles R1, R2 and R3, respectively. As illustrated, the particles sizes increase from the smaller particle size of R1, as illustrated in FIG. 11A, to the next larger particle size of R2, as illustrated in FIG. 11B, to the largest particle size of R3, as illustrated in FIG. 11C.

In use and operation, as the potency to excitation increases, the relative quantities of luminescent particles used to convert the same amount of light may decrease. For example, in the case of a luminescent particle used to convert blue light to red light, the amount of luminescent particles used to achieve a desired color point may be decreased when using luminescent particles having lower diffuse reflectance (i.e., an increased absorption/conversion rate/potency). A desired color point may be identified using predetermined ranges and/or regions in, for example, a mathematically defined color space such as CIE 1931, among others. The desired color point may be designated as a region and/or bin having a designation that may be based on the coordinate values of a some predetermined point of the region/bin, such as, for example, the center point.

The color point of light that includes a combination of blue light emitted from a light source and red light emitted from a luminescent particle that down converts received blue light into red light may correspond to a purplish color in the visible spectrum. As the potency of a luminescent particle is increased, the weight percent of the particles that are mixed with an encapsulant may decrease for a given color point. For example, in comparing conventional luminescent particles to R2 luminescent particles, test results indicate that about 8.3 weight percent of the conventional luminescent particles were required to achieve a desired color point that only required about 6.0 weight percent of the R2 luminescent particles. In this regard, the R2 particles exhibited an increased potency to blue excitation relative to the conventional luminescent particles.

Some embodiments provide that the luminescent particles may be combined with yellow emitting luminescent particles. The light emitted from the yellow emitting luminescent particles and red emitting luminescent particles may combine with blue light to produce a warm white light. As is known, varying the amount of red emitting luminescent particles may vary the warmth of the white light. In this regard, a yellow to red weight percent ratio may be determined to yield a particular color point, as may be defined in a mathematically defined color space. For example, in some embodiments, the warm white light may correspond to CIE 1931 E8 or E9 bins, among others.

Results of comparisons of the potency of the conventional luminescent particles and the R2 luminescent particles indicated that the yellow/red ratio using conventional luminescent particles was about 2.4 whereas the yellow/red ration using the R2 luminescent particles was about 4.2. Thus, the quantity of R2 used to achieve the desired color point was slightly greater than half the quantity of the conventional particles that were used to achieve the same color point. Accordingly, the increased potency of the luminescent particles according to embodiments described herein, as indicated by the lower diffuse reflectance, resulted in less luminescent conversion material required to accomplish the same color point.

In addition to economic benefits that may be realized by using less luminescent conversion material, by reducing the amount of conversion material that is interacting with the primary emissions (in this case, the blue light), the luminous flux, which is the apparent amount of light produced, may be increased.

Figure 12:
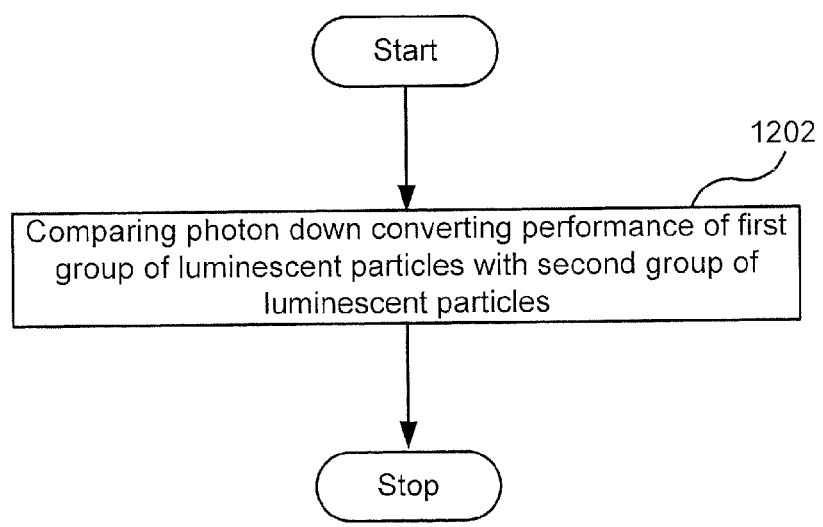
FIG. 12 a flow diagram illustrating methods of identifying a potency to excitation characteristic in a luminescent particle according to some embodiments of the present invention.

Reference is now made to FIG. 12, which is a flow diagram illustrating operations for identifying a potency to excitation characteristic in a luminescent particle according to some embodiments of the present invention. Operations may include comparing a down photon converting performance of a first group of luminescent particles as described herein with a second group of luminescent particles including conventional luminescent particles (block 1202). Comparing the photon down converting performance includes estimating respective diffuse reflectance signatures corresponding to each of the first and second groups of luminescent particles. In some embodiments, the estimated diffuse reflectance signatures may be compared to determine which of the first and second groups includes a higher absorption rate, which may be inversely related to diffuse reflectance.

Some embodiments provide that comparing the estimated diffuse reflectance signatures includes estimating the diffuse reflectance of two groups of different types of luminescent particles and identifying whichever one of the two groups that has the lower diffuse reflectance as the group having a greater potency to excitation characteristic. Estimating the diffuse reflectance of the groups of luminescent particles may include directing light, which includes a dominant wavelength of light, at the respective groups and receiving the light having the dominant wavelength of light that is reflected from the respective groups of luminescent particles. In some embodiments, the diffuse reflectance may be expressed in terms of percent reflectance.

Some embodiments provide that the dominant wavelength may correspond to substantially blue light in the visible spectrum. For example, the dominant wavelength may be in a range of about 380 nm to about 470 nm. In some embodiments, the emitted light may have a dominant wavelength of about 450 nm. The luminescent particles may be operable to down convert absorbed light into an emitted light having a maximum emission at a wavelength in a range of about 500 nm to about 700 nm. For example, in some embodiments, the luminescent particle includes a composition that absorbs light in the blue portion of the visible spectrum and emits light in the red portion of the visible spectrum.

The luminescent particles according to embodiments described herein may provide improved potency to excitation relative to conventional particles as a result of a surface effect wherein a reflectance reducing outer surface may include a reduction in the angular deviation among adjacent regions on the surface of the particle. Stated differently, the reflectance reducing outer surface may include contours that are substantially more continuous and thus have surface morphology with a smooth contour relative to conventionally produced particles. Further, a reflectance reducing outer surface according to some embodiments of the present invention may reduce surface stresses and/or defects in the particle by reacting the particle material at the boundaries between components in the atomic structure of the particle.

In addition to reducing reflectance of received light, such surface morphology may reduce internal reflection corresponding to photons that are converted within the particle. In this manner, the portion of the received light that is converted and emitted may be dramatically increased.

As provided herein, even incremental improvements in conversion efficiency may be substantially amplified in terms of relative quantities of luminescent particles that may be used to accomplish specific light emission goals.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A plurality of luminescent particles, each of the luminescent particles comprising:
   an interior portion comprising a luminescent compound comprising a nitride that is configured to perform a photon down conversion on a portion of received light;
   a passivating region on an outer surface of the interior portion and operable to inhibit reactions involving the luminescent compound,
   wherein the passivating region comprises nitrogen, the nitrogen being present at a reduced percentage compared to the interior portion of the luminescent particle; and
   a reflectance reducing outer surface of each luminescent particle that is configured to increase the portion of received light that is absorbed in the luminescent particle, wherein the reflectance reducing outer surface includes a substantially continuous contoured surface,
   wherein the plurality of luminescent particles comprise a first diffuse reflectance of from 31.1% to 34.2% at a dominant wavelength of light of about 450 nm.

2. A light emitting device comprising:
   the plurality of luminescent particles of claim 1; and
   a light emitting source.

3. The light emitting device according to claim 2,
   wherein the plurality of luminescent particles are dispersed within a silicone encapsulant, wherein the light emitting source emits radiation with a maximum emission at a wavelength in a range of about 380 to about 470 nm, and wherein the luminescent particles absorb at least some of the light emitted from the light emitting source and emits light having a maximum emission at a wavelength in a range of about 500 to about 700 nm.

4. The light emitting device according to claim 2,
   wherein a plurality of first luminescent particles including the plurality of luminescent particles include a first size range and the first diffuse reflectance at the dominant wavelength of light,
   where a plurality of second luminescent particles not including the plurality of luminescent particles include a second size range that is similar to the first size range and a second diffuse reflectance at the dominant wavelength of light.

5. The plurality of luminescent particles according to claim 1 comprising a D50 particle size of from 9.4 microns to 12.8 microns.

6. The plurality of luminescent particles according to claim 1, wherein the luminescent compound is selected from the group consisting of $Ca_{1-x}Sr_xAlSiN_3$, $Ca_2Si_5N_8$, $Sr_2Si_5N_8$, $Ba_2Si_5N_8$, $BaSi_7N_{10}$, $BaYSi_4N_7$, $Ca_{1.5}Si_9Al_3N_{16}$, and $CaSiN_2$, where $0 \leq x \leq 1$.

7. The plurality of luminescent particles according to claim 6, wherein the luminescent compound is $Ca_{1-x}Sr_xAlSiN_3$, where $0 \leq x \leq 1$.

8. The light emitting device according to claim 2,
wherein the plurality of luminescent particles are mixed with an encapsulant,
wherein the light emitting source emits radiation with a maximum emission at a wavelength in a range of about 380 to about 470 nm, and
wherein the plurality of luminescent particles absorb at least some of the light emitted from the light emitting source and emit light having a maximum emission at a wavelength in a range of about 500 to about 700 nm, the plurality of luminescent particles being red-emitting luminescent particles.

9. The light emitting device according to claim 8, wherein a concentration of the red-emitting luminescent particles mixed with the encapsulant is about 6 wt.%.

10. The light emitting device according claim 9, further comprising a plurality of yellow-emitting luminescent particles, wherein a weight ratio of the yellow-emitting luminescent particles to the red-emitting luminescent particles is about 4.2.

* * * * *